March 17, 1931.   L. KREUTZKAMP   1,796,998
SAFETY GAS VALVE
Filed Jan. 15, 1929
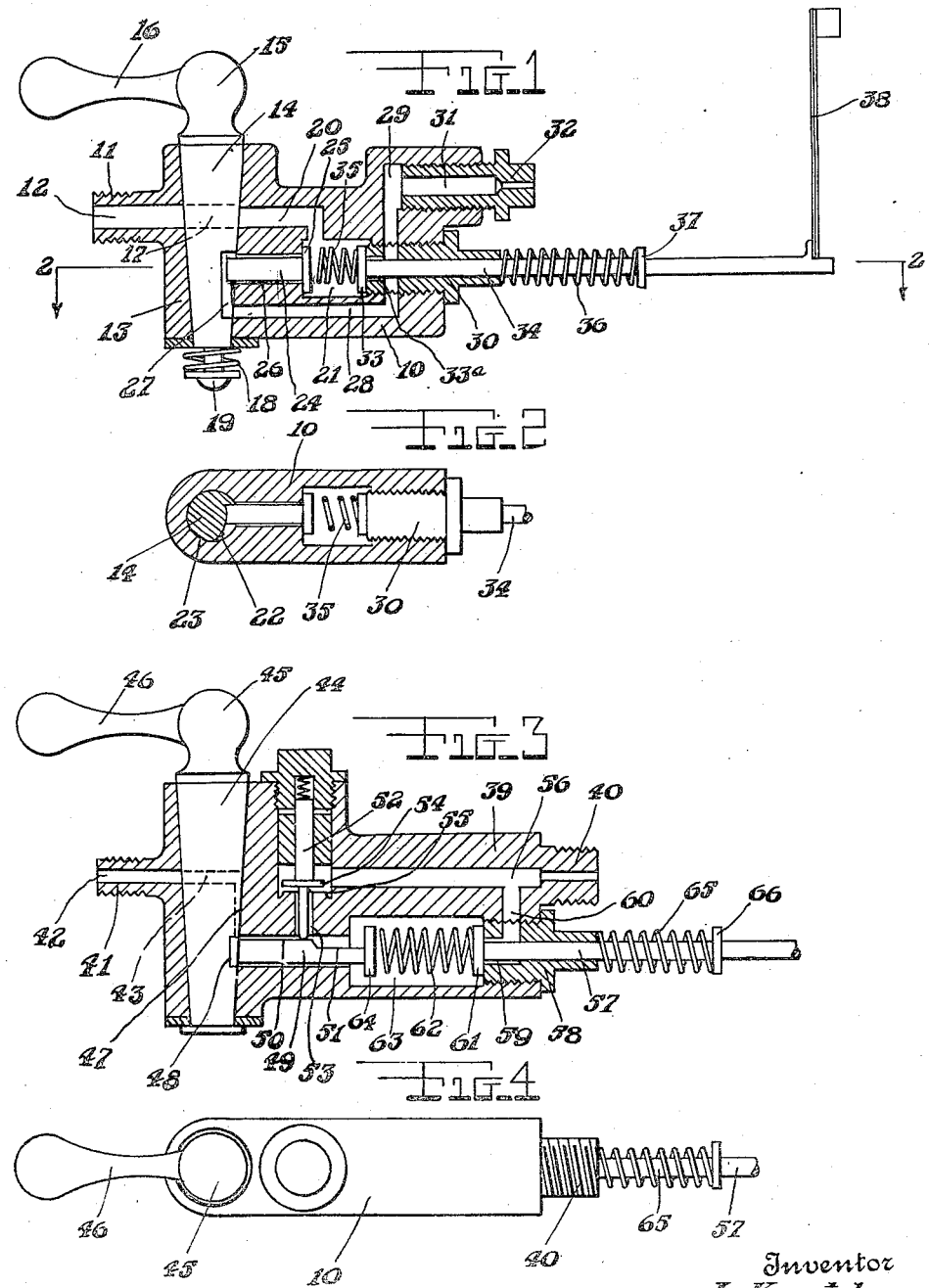

Patented Mar. 17, 1931

1,796,998

UNITED STATES PATENT OFFICE

LOUIS KREUTZKAMP, OF MASPETH, NEW YORK

SAFETY GAS VALVE

Application filed January 15, 1929. Serial No. 332,672.

The main object of this invention is to provide a valve suitable for use on gas ovens, gas ranges and similar other heating appliances which require a valve, and the valve has for its main purpose to automatically close the supply of gas immediately upon extinguishing of the flame.

Another object of this invention is to provide a gas valve which is automatically closed by a thermostat coupling immediately as the flame is extinguished.

The above and other objects will become apparent in the description below, in which like characters of reference refer to like-named parts in the drawing.

Referring briefly to the drawing, Figure 1 is a longitudinal sectional elevational view of the preferred type of gas valve, showing the same in closed position.

Figure 2 is a sectional plan view taken on line 2—2 of Figure 1.

Figure 3 is a longitudinal sectional elevational view of a modified type of gas valve.

Figure 4 is a top plan view of Figure 3.

Referring in detail to the drawing, the numeral 10 indicates the elongated body of the valve. Said body, at one end, is provided with an inlet nipple 11 in which a channel 12 is formed. This channel 12 communicates with a tapered bore 13 in which a tapered shank 14 is adapted to be rotated through an arc of ninety degrees. The shank 14 is provided with a head 15 from which an angular grip handle 16 extends. The shank 14 is provided with a diametral port 17 and its lower end is provided with a coil spring 18 and a screw stud 19 which secures the shank 14 in the bore 13 of the body. The channel 12, in the nipple and body, has aligned therewith a second passageway 20 on the opposite side of the bore 13 which also communicates with the port 17 in the tapered shank 14. The opposite end of this passageway is deflected downwardly and enters into a chamber 21.

Intermediate the height of the shank 14 a curved cam depression 22 is formed. This depression has an abrupt shoulder at one extremity and its opposite end merges with the periphery 23 of the shank 14, as illustrated in Figure 2. The cam depression has one end of a plunger 24 riding thereon. The plunger is provided with a head 25 and is loosely guided in an aperture 26 which is of sufficient area to permit gas to flow between the plunger and the surface of the aperture. The cam depression at its greatest depth is provided with a longitudinally extending channel 27 which extends in a lowering direction and communicates at its lower end, when the valve shank is in closed position, with a canal 28 formed in the body 10. This canal communicates with a vertical passageway 29 which is formed through a threaded nipple 30, and the opposite end of this passageway communicates with the bore 31 of a second threaded detachable nipple 32, the latter being the member which is thrust into the sleeve of the burner of gas ranges and ovens.

The sleeve 30 has a bore passing therethrough which is enlarged at its inner end to permit the circulation of gas when the head 33 of a slide rod 34 is raised from the seating surface formed at the end of this nipple. A spring 35 is housed within the chamber 21. When in released condition the spring is of such length as not to come in contact with the heads 25 and 33 when the members (of which the heads form a part) are projected into end guideways. The slide rod 34 is normally held in a position in which it extends from the nipple 30 by an expansion coil spring 36 which seats upon a collar 37 and is tensioned so that it has the tendency of withdrawing the slide rod from the nipple. The end of the slide rod 34 cooperates with a thermostat coupling 38 which is adapted to be affected by heat with the tendency of being deflected thereby toward the valve body 10.

The modified form of device, shown in Figures 3 and 4, is of the same principle as the preferred form shown in Figures 1 and 2 but its organization is somewhat different and brings about the same result in a somewhat different manner. It also is thermostatically operated, using therefor a thermostat coupling which cooperates with a slide rod as in the preferred form. The detailed description of the structure of the modified type of valve is as follows: An elongated element 39 serves as the body. This element has a nipple 40 at one end and a similar, but smaller, threaded nipple 41 at its opposite end. The nipple 41 has a channel 42 passing therethrough which is adapted to communicate with a port 43 formed diametrically in a tapered shank 44. This shank is surmounted by a head 45 which has projecting therefrom a grip handle 46. The tapered shank 44 is rotatably mounted in a bore formed in the body 39 of the modified type of valve and is adapted to swing an arcuate distance of ninety degrees, from the closed to the open position, or vice versa. The port 43 communicates at its one end with a canal 47 which extends longitudinally along the shank 44 toward its smaller end and its lower end communicates with the cam depression 48 which is of identical construction to that used in the preferred form and indicated by the numeral 22 in Figure 2.

This cam depression 48 has an arcuate length of ninety degrees and is adapted to project a plunger 49 when the shank is rotated from the open to the closed position. This plunger 49 is square in cross section and is provided with two surfaces 50 and 51. The surface 50 is raised above the surface 51 and is adapted to support a rider stud 52. This stud is reduced at its lower end and fits into an oversized opening 53 and, where the upper portion and thinner portion join, a flange 54 is formed which is adapted to contact with a seat 55 and close the opening 53 so that ingress of the gas will not be had into the channel 56.

A slide rod 57 is movably mounted in the opening of a threaded detachable nipple 58. This nipple has an oversized hole 59 at one end which communicates with a connecting channel 60 which joins the oversized hole 59 and channel 56. The slide rod 57 is provided with a flanged head 61 upon which is normally seated a coil spring 62. This coil spring is housed in a chamber 63 and is of a shorter length than the distance between the head 61 of the slide rod and the head 64 of the plunger 49. The slide rod is adapted to be normally retained in extended position by a coil spring 65 which yieldably urges a collar 66, connected to the slide rod, outwardly.

The valve is adapted to operate and close the supply of illuminating gas passing through it upon deflection of a thermo coupling such as indicated by the numeral 38. When a burner is positioned adjacent this thermo coupling 38 it will be affected by the flame and is adapted to be deflected thereby. In operating the valve, the grip handle 16 of the preferred type of valve is rotated from the open to the closed position. When the shank 14 has been rotated to the closed position from the open position the end of the plunger 24 is caused to ride upon the surface of the cam depression 22, thus lifting the head 25 of the plunger from the seat, as the ninety degrees swing of the shank is completed. The valve at that particular instant is completely closed and no gas will flow. A match is then struck and held above the ports in the gas burner. The grip handle 16 is then rotated to the open position. This movement will align the diametral port 17 in the shank 14 with the channels 12 and 20. The gas will flow from the fuel supply pipe, into which the nipple 11 is tapped, into the channel 20, then into the chamber 21. This gas flowing into the chamber finds egress therefrom into the enlarged aperture 26, then passes through the channel 27 into the passageways 28 and 29 and then out of the valve through the opening 31 and the nipple 32. As this flow of gas arrives at the burner it is instantly ignited by the struck match and the heat of the ensuing flame deflects the thermo coupling 38. This thermo coupling urges the slide rod 34 into the nipple 30, thereby unseating the head 33 of the slide rod. This head moves the coil spring 35 rearwardly in the chamber 21 until it finally comes in contact with the plunger head 25 which it moves to closed position. With this action the flow of gas through the passageway 28 is stopped and an auxiliary passageway is created, as the gas will, after the head 33 is lifted from its seat, flow through the enlarged opening 33a into the passageway 29 and then out through the opening in the nipple 32. Should the flame at any instant be extinguished the thermo coupling will move (within a short interval of time not sufficient to asphyxiate anyone) from its deflected position to its normally cold position, shown in Figure 1. As the plunger 24 is already in closed position and the thermo coupling assumes its original position, the tension of the coil spring 36 upon the collar 37 will extend the slide rod 34 thereby seating the head 33 of the slide rod upon its seat and completely closing the valve.

In the modified form of valve the function of the valve is much similar to that shown in the preferred form. In this modified form, the shank 44 is originally rotated to the closed position. This rotation moves the plunger 49 inwardly, as its end rides upon the surface of the cam depression 48. When this function has been completed the shank 44 is in closed position and the plunger is in extended position, as Figure 3 of the drawing illustrates. Originally, when the shank is in open position, the plunger lies in the cam depression and the rider stud has its flange 54 resting upon its seat 55, cutting off the supply of illuminating gas in this direction. When the shank has been rotated to open position gas will flow through the channel 42 through the aligned port 43 and into the channel 47, finally passing through the opening 53 from the enlarged hole in which the plunger 49 is operable. As the plunger is retracted the lower end of the rider stud will ride upon the elevated surface 50 of the plunger and will thereby have its flange 54 lifted above its seat, thus permitting gas to flow through the opening 53 and into the channel 56 and then through the nipple 40 to the burner. This illuminating gas is then ignited, deflecting the thermo coupling 38 (which cooperates with the illustrated rider stud in a manner similar to that illustrated in Figure 1) and, by deflecting, urges the slide rod 57 inwardly to unseat the head 61 of the slide rod and yieldably compress the spring 62 which, during this compression, exerts a pressure upon the plunger 49, moving the latter and thereby permitting lowering of the flange 54 to seating position, closing egress of the gas through the channel 56. As the thermo coupling has been deflected, gas will flow through the enlarged hole into the passageway 60 and then out through the opening in the nipple 40 until such time as the flame is extinguished, when the thermo coupling will assume its original position and permit the slide rod to have its head 61 again in contact with its seat on the surface of the nipple 58.

It is to be noted that certain changes in form and construction may be made without departing from the spirit and scope of the invention.

I claim:

1. In a valve, a body having a plurality of channels and a chamber, one of said channels leading to an outlet, another of said channels leading to said chamber and to said outlet, heat-influenced means for closing communication between said chamber and said first-named channel, a rotatable shank closing another of said channels, a cam depression on said shank, and means actuated by said cam depression for opening another of said channels upon rotating said shank to closed position.

2. In a valve, a body having a channel and chamber therein, said chamber communicating with said channel, a shank rotatable in said body having a port therein, said port aligned with said channel, a cam depression formed in said shank, an aperture passing from said chamber to said cam depression in said body, a plunger in said aperture, a second channel in said body communicating with said cam depression, said plunger being adapted to be lifted to open position upon rotating said shank to closed position, and heat-influenced means for opening or closing communication between said chamber and said second-named channel.

3. In a valve, a body having a channel, a compartment therein communicating with said channel, a rotatable shank having a port therein aligned with said channel, a second channel, said first-named channel communicating with said second-named channel through said compartment, means on said shank for opening said second-named channel from said compartment when said shank is rotated to closed position, and heat-influenced means adapted to close said first-named means upon the application of heat after said shank has been rotated from the closed to the open position.

4. In a valve, a body having a channel and a chamber communicating with said channel, a rotatable shank having a cam depression formed therein, an aperture communicating with said cam depression and said chamber, a plunger in said aperture, a second channel communicating with an outlet, said cam depression being adapted to extend said plunger to open position when said shank is rotated from the open to the closed position, and heat-influenced means operable in said chamber for urging said plunger to closing position over said aperture when said shank has been rotated to open position.

5. In a valve, a body having a channel and a chamber communicating with said channel, a rotatable shank having a cam depression formed therein, an aperture communicating with said cam depression and said chamber, a plunger in said aperture, a second channel communicating with an outlet, said cam depression being adapted to extend said plunger to open position when said shank is rotated from the open to the closed position, a slide rod movable in said body, an enlarged channel bounding said slide rod and communicating with said chamber and said second-named channel, a thermo coupling cooperating with said slide rod and adapted to be deflected by heat and urge said slide rod into said valve body after said plunger has been moved to the open position.

6. In a valve, a body having a channel and a chamber communicating with said channel, a rotatable shank having a cam depression formed therein, an aperture communicating with said cam depression and said chamber, a plunger in said aperture, a second channel communicating with an outlet, said cam depression being adapted to extend said plunger to open position when said shank is rotated from the open to the closed position, a slide rod movable in said body, an enlarged channel bounding said slide rod and communicating with said chamber and said second-named channel, a thermo coupling cooperating with said slide rod and adapted to be deflected by heat and urge said slide rod into said valve body after said plunger has been moved to the open position, and means cooperating with said slide rod for urging said plunger to closing position as said slide rod is being moved to open position.

7. In a valve, a body having a channel and a chamber communicating with said channel, a rotatable shank having a cam depression formed therein, an aperture communicating with said cam depression and said chamber, a plunger in said aperture, a second channel communicating with an outlet, said cam depression being adapted to extend said plunger to open position when said shank is rotated from the open to the closed position, a slide rod movable in said body, an enlarged channel bounding said slide rod and communicating with said chamber and said second-named channel, a thermo coupling cooperating with said slide rod and adapted to be deflected by heat and urge said slide rod into said valve body after said plunger has been moved to the open position, a head on said slide rod for closing communication between said chamber and said second-named channel, and resilient means contacting with said head of said slide rod for urging said plunger into closing position after said valve shank has been rotated to open position and as said slide rod is being moved to open position.

8. In a valve, a body having a channel and a chamber communicating with said channel, a rotatable shank having a cam depression formed therein, an aperture communicating with said cam depression and said chamber, a plunger in said aperture, a second channel communicating with an outlet, said cam depression being adapted to extend said plunger to open position when said shank is rotated from the open to the closed position, a slide rod movable in said body, an enlarged channel bounding said slide rod and communicating with said chamber and said second-named channel, a thermo coupling cooperating with said slide rod and adapted to be deflected by heat and urge said slide rod into said valve body after said plunger has been moved to the open position, a head on said slide rod for closing communication between said chamber and said second-named channel, a resilient spring contacting with the head of said slide rod and of a length suitable to permit independent movement of said plunger, said thermo coupling when deflected being adapted to retract said slide rod into said valve chamber, compress said spring and cause said spring to engage said plunger to move the latter to the closed position thereby closing communication between the chamber and the aperture and opening communication between the chamber and the second-named channel.

In testimony whereof I affix my signature.

LOUIS KREUTZKAMP.